United States Patent
Ishikawa

(10) Patent No.: US 9,317,221 B2
(45) Date of Patent: Apr. 19, 2016

(54) DISTRIBUTED STORAGE SYSTEM AND DISTRIBUTED STORAGE METHOD

(75) Inventor: Kenichiro Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 284 days.

(21) Appl. No.: 14/005,435

(22) PCT Filed: Jun. 16, 2011

(86) PCT No.: PCT/JP2011/063842
§ 371 (c)(1),
(2), (4) Date: Sep. 16, 2013

(87) PCT Pub. No.: WO2012/124178
PCT Pub. Date: Sep. 20, 2012

(65) Prior Publication Data
US 2014/0019683 A1   Jan. 16, 2014

(30) Foreign Application Priority Data
Mar. 16, 2011   (JP) .................................. 2011-058340

(51) Int. Cl.
*G06F 17/30* (2006.01)
*G06F 3/06* (2006.01)

(52) U.S. Cl.
CPC .............. *G06F 3/0659* (2013.01); *G06F 3/061* (2013.01); *G06F 17/302* (2013.01); *G06F 3/067* (2013.01)

(58) Field of Classification Search
CPC ..... G06F 17/302; G06F 3/067; G06F 3/0659; G06F 3/061
USPC ........................................ 711/114; 707/705
See application file for complete search history.

(56) References Cited

U.S. PATENT DOCUMENTS 6,438,562 B1 * 8/2002 Gupta et al. ................... 707/696
6,438,705 B1 * 8/2002 Chao et al. ................... 714/4.11
7,418,454 B2 * 8/2008 Chen et al.
(Continued)

FOREIGN PATENT DOCUMENTS

| JP | 2002-92198 A | 3/2002 |
| JP | 2005-235171 A | 9/2005 |

(Continued)

OTHER PUBLICATIONS

Dabek, Frank, et al., "Vivaldi: A Decentralized Network Coordinate System", SIGCOMM '04, Portland, OR, Aug. 30-Sep. 3, 2004, pp. 15-26.*

(Continued)

*Primary Examiner* — Robert Stevens

(57) ABSTRACT

A distributed storage system comprises a plurality of data storage nodes that store a plurality of object data items in a distributed manner. The plurality of object data items are respectively characterized by a data coordinate and identified by a data identifier. The plurality of data storage nodes are respectively assigned a node coordinate in a space identical to that of the data coordinate. After selecting as first data storage nodes from among the plurality of data storage nodes a plurality of data storage nodes each assigned a node coordinate having a relatively short distance from a data coordinate characterizing each of the plurality of object data items, any of the object data item is respectively stored in a data storage node determined based on a data identifier that identifies the object data item from among the plurality of first data storage nodes.

16 Claims, 9 Drawing Sheets

(56) References Cited

U.S. PATENT DOCUMENTS

| | | | |
|---|---|---|---|
| 7,752,311 B2* | 7/2010 | Walker et al. | 709/226 |
| 7,778,183 B2* | 8/2010 | Fan et al. | 370/238 |
| 7,953,858 B2* | 5/2011 | Xu et al. | 709/227 |
| 7,953,875 B2* | 5/2011 | Bonsma et al. | 709/230 |
| 7,996,502 B2* | 8/2011 | Walker et al. | 709/222 |
| 2002/0044533 A1* | 4/2002 | Bahl et al. | 370/255 |
| 2004/0060409 A1 | 4/2004 | Leung et al. | |
| 2004/0143666 A1* | 7/2004 | Xu et al. | 709/227 |
| 2005/0144172 A1 | 6/2005 | Kilian et al. | |
| 2005/0243740 A1* | 11/2005 | Chen et al. | 370/256 |
| 2008/0198752 A1* | 8/2008 | Fan et al. | 370/238 |
| 2008/0215734 A1* | 9/2008 | Walker et al. | 709/226 |
| 2010/0228841 A1* | 9/2010 | Walker et al. | 709/222 |
| 2010/0235428 A1 | 9/2010 | Kikkawa | |
| 2011/0106772 A1* | 5/2011 | Kawamura et al. | 707/687 |
| 2011/0172956 A1* | 7/2011 | Nakadai | 702/158 |

FOREIGN PATENT DOCUMENTS

| | | |
|---|---|---|
| JP | 2006-350470 A | 12/2006 |
| JP | 2007-293619 A | 11/2007 |
| JP | 2010-184109 A | 8/2010 |
| WO | 2007/145069 A1 | 12/2007 |

OTHER PUBLICATIONS

Balakrishnan, Hari, et al., "Looking Up Data in P2P Systems", Communications of the ACM, vol. 46, No. 2, Feb. 2003, pp. 43-48.*

Agarwal, Sharad, et al., "Volley: Automated Data Placement for Geo-Distributed Cloud Services", NSDI '10, 7th USENIX Symposium on Networked Systems Design and Implementation, San Jose, CA, Apr. 28-0, 2010, pp. 17-32.*

Arya, Sunil, et al., "An Optimal Algorithm for Approximate Nearest Neighbor Searching in Fixed Dimensions", Journal of the ACM, vol. 45, No. 6, Nov. 1998, pp. 891-923.*

David Karger et al., "Consistent Hashing and Random Trees: Distributed Caching Protocols for Relieving Hot Spots on the World Wide Web", 1997, retrieved from the internet [http://thor.cs.ucsb.edu/~ravenben/papers/coreos/kll+97.pdf], 10 pages.

Sage A. Weil et al., "CRUSH: Controlled, Scalable, Decentralized Placement of Replicated Data", Storage Systems Research Center, University of California, Santa Cruz, Nov. 2006, Retrieved from the internet [http://www.ssrc.ucsc.edu/Papers/weil-sc06.pdf], 12 pages.

International Search Report for PCT Application No. PCT/JP2011/063842 mailed on Aug. 23, 2011, 5 pages.

* cited by examiner

FIG. 9

| STORAGE TABLE | |
|---|---|
| INFORMATION OF STORAGE NODE A | 0 |
| INFORMATION OF STORAGE NODE B | 1 |
| INFORMATION OF STORAGE NODE C | 2 |
| INFORMATION OF STORAGE NODE D | 4 |
| INFORMATION OF STORAGE NODE E | 6 |
| INFORMATION OF STORAGE NODE F | 8 |
| INFORMATION OF STORAGE NODE G | 7 |
| INFORMATION OF STORAGE NODE H | 12 |
| INFORMATION OF STORAGE NODE I | 13 |

111

DISTRIBUTED STORAGE SYSTEM AND DISTRIBUTED STORAGE METHOD

CROSS-REFERENCE TO RELATED APPLICATIONS

The present application is a National Stage Entry of PCT/JP2011/063842 filed Jun. 16, 2011, which is based on and claims the benefit of the priority of Japanese Patent Application No. 2011-058340 filed on Mar. 16, 2011, the disclosures of all of which are incorporated herein in their entirety by reference.

TECHNICAL FIELD

The present invention relates to a distributed storage system and a distributed storage method, and in particular, to a distributed storage system and a distributed storage method that store a plurality of data items which are to be processed, using a plurality of nodes.

BACKGROUND

In a distributed storage system, data items (or data) (referred to below as "object data items") that are to be processed are stored in large amounts in a state in which the data items are distributed among a plurality of storage nodes. Here, a storage node refers to a storage apparatus or the like that stores the object data items.

In the distributed storage system, a large number of storage nodes store the object data items. In this case, a method of managing handling of the storage nodes and the object data items stored by the storage nodes is a problem. Heretofore, a method of managing the handling of the storage nodes and the object data items stored by the storage nodes by a small number of fixed management nodes has been proposed. However, with this method there are problems such as a tendency for bottlenecks to form in the management nodes and a lack of scalability. In order to overcome these problems, a system that manages the handling with a large number of management nodes is proposed. According to the system in question, since processing to control storage nodes that store object data items is not centralized in one or a small number of fixed management nodes, it is possible to more efficiently perform distributed storage of data in a large number of storage nodes.

In a case of a system that does not possess a fixed management node to perform centralized control, it is difficult to record and manage, in a table, storage nodes that store object data items. This is because a table that records storage nodes that store the object data items becomes very large as the number of object data items increases, and it becomes difficult to synchronize and manage the large table with a large number of management nodes.

Therefore, a method is proposed by which storage nodes to store the object data items are determined by an algorithm. By determining storage nodes to store object data items by an algorithm, based on data information such as object data item identifiers and the like, it is no longer necessary to synchronize a large table by a large number of management nodes, and it is possible to handle the large number of object data items.

Patent Literature 2010-184109 (referred to below as Patent Literature 1) and Non Patent Literature (NPL) 1 and Non Patent Literature 2, as described above, propose a method of storing object data items in a large number of storage nodes, without using fixed management nodes that perform centralized control of the entire system.

FIG. 8 is a diagram showing an example of a system configuration of a distributed storage system related to the present invention. The distributed storage system 100 shown in FIG. 8 is an example of a distributed storage system that does not use the abovementioned fixed management nodes.

The distributed storage system 100 is provided with a plurality of storage nodes 101 and client nodes 110. A storage node 101 receives a read command from a client node 110, executes the command to read an object data item stored by the storage node 101, and returns the object data item to the client node 110 that issued the command, and also receives a write command from the client node 110, executes the command to write an object data item sent from the client node 110, and storing the object data item.

Here, a description is given concerning a case where, in the distributed storage system 100 shown in FIG. 8, as an example, processing of reading an object data item having a data identifier "000001" is executed. In this processing, a unique number is assigned in advance to each storage node 101. Here, all client nodes 110 have a storage table 111 that stores information of all the storage nodes 101 and numbers allocated to the storage nodes 101. FIG. 9 shows an example of the storage table 111.

When the processing starts, first the client node 110 generates pseudo random numbers, wherein all numbers allocated to the storage nodes 101 stored in the storage table 111 are generated with equal probability, with a data identifier "000001" as a seed (random number seed). An algorithm such as one to generate the same random number sequence for the same seed is used as the algorithm to generate the pseudo random numbers. Generation of pseudo random numbers is repeated until a pseudo random number is generated that is the same as a number allocated to a storage node 101. In a case where a pseudo random number the same as the number allocated to the storage node 101 is generated, an access command is sent to the storage node 101 that has been allocated the number corresponding to the pseudo random number. Next, the storage node 101, to which the number corresponding to the pseudo random number has been allocated, executes the received access command and obtains the object data item. Finally, the storage node 101 sends the object data item to the client node 110, and the read processing is completed.

In the distributed storage system 100, the object data item is distributed to the storage nodes 101 approximately uniformly. In a case of adding a storage node 101 to the distributed storage system 100, or in a case of cutting a storage node 101 from the distributed storage system 100, by moving the minimum of object data items, it is possible to maintain the approximately uniform distribution.

In this way, according to the abovementioned method, it is possible to store object data items in a large number of storage nodes 101 by an algorithm, without using fixed specific nodes that perform centralized control of the entire system. That is, according to the abovementioned system configuration, it is possible to store object data items by uniform distribution with a large number of storage nodes 101. According to the abovementioned system configuration, flexible handling is possible even in a case where the number of storage nodes 101 changes.

NPL 1:
David Karger, Eric Lehman, Tom Leighton, Matthew Levine, Daniel Lewin, Rina Panigrahy, "Consistent hashing and random trees: distributed caching protocols for relieving hot spots on the World Wide Web," 1997.

NPL 2:

Sage A. Weil, Scott A. Brandt, Ethan L. Miller, Carlos Maltzahn, "CRUSH: Controlled, Scalable, Decentralized Placement of Replicated Data," 2006.

SUMMARY

The entire disclosures of the abovementioned Patent Literature and Non Patent Literatures are incorporated herein by reference thereto. The following analysis is given by the present invention.

In methods described in Patent Literature 1, Non Patent Literature 1 and Non Patent Literature 2, respective object data items are stored in storage nodes without classification. In this case, in a case of processing an object data item having a specific property, in a storage node, it is necessary to collect the object data item from a large number of storage nodes to the storage node in question. As the number of storage nodes increases, the amount of processing to collect the object data item to a specific node becomes very large.

Accordingly, it is desired, by determining storage nodes to store an object data item based on a property of the object data item, to implement storing of an object data item having the same or a similar property in a biased manner in a small number of storage nodes, and, in a distributed processing environment that does not use a specific node to centrally manage and control a plurality of storage nodes, while distributing objects approximately uniformly to the respective storage nodes, to enable limitation to storage nodes having an object data item to be processed, when processing an object data item having the particular property.

In particular, there is a need in the art to uniformly distribute and store an object data item in a plurality of data storage nodes, and also have an object data item in a biased manner in some data storage nodes in accordance with a characteristic of the object data item.

According to a first aspect of the present invention, there is provided a distributed storage system, comprising: a plurality of data storage nodes that store a plurality of object data items in a distributed manner. The plurality of object data items are respectively characterized by a data coordinate and identified by a data identifier. The plurality of data storage nodes are respectively assigned a node coordinate in a space identical to that of the data coordinate. After selecting as first data storage nodes from among the plurality of data storage nodes a plurality of data storage nodes each assigned a node coordinate having a relatively short distance from a data coordinate characterizing each of the plurality of object data items, any of the object data items is stored respectively in a data storage node determined based on a data identifier that identifies the object data item from among the plurality of first data storage nodes.

According to a second aspect of the present invention, there is provided a distributed storage method, comprising: storing in a distributed manner a plurality of object data items each characterized by a data coordinate and uniquely identified by a data identifier; assigning a node coordinate in a space identical to that of the data coordinate to each of the plurality of data storage nodes; selecting as first data storage nodes from among the plurality of data storage nodes a plurality of data storage nodes each assigned a node coordinate having a relatively short distance from a data coordinate characterizing each of the plurality of the object data items; and storing the object data item in a data storage node determined based on a data identifier that identifies the object data item from among the plurality of first data storage nodes.

The present invention provides the following advantage, but not restricted thereto. According to the distributed storage system and distributed storage method according to the present invention, it is possible to uniformly distribute and store an object data item in a plurality of data storage nodes and additionally to have an object data item present in some data storage nodes in a biased manner in accordance with characteristics of the object data item.

BRIEF DESCRIPTION OF THE DRAWINGS

FIG. 9 is a diagram showing an example of storage content of a storage table 111 of FIG. 8.

PREFERRED MODES

Figure 1:
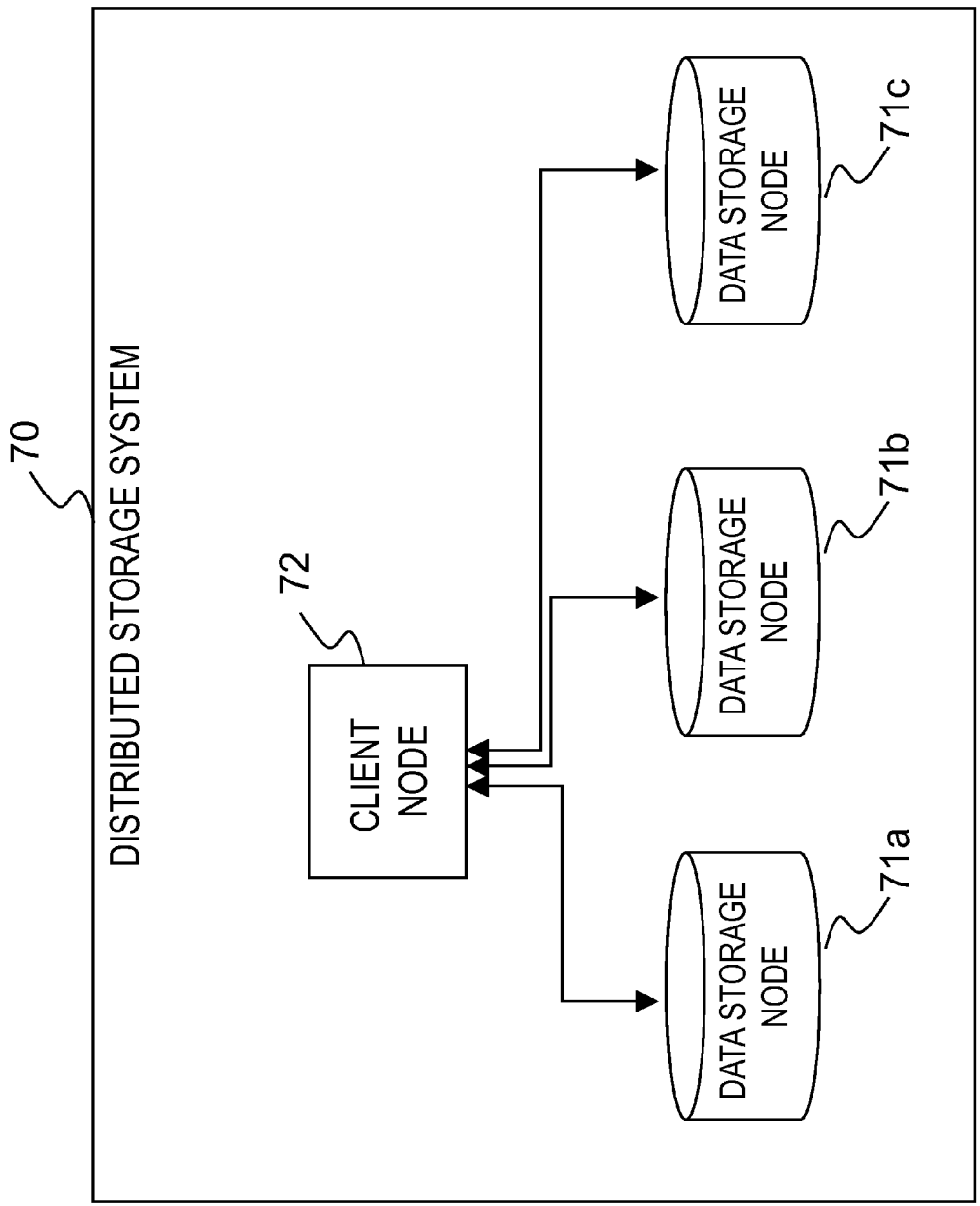
FIG. 1 is a block diagram schematically showing a configuration of a distributed storage system according to the present description.

In the present disclosure, there are various possible modes, which include the following, but not restricted thereto. First, an outline of the present description is described. It is to be noted that reference symbols in the drawings attached to this outline are examples solely to aid understanding and are not intended to limit the present description to modes shown in the drawings.

Referring to FIG. 1, a distributed storage system (70) comprises a plurality of data storage nodes (71*a* to 71*c*) that store a plurality of object data items in a distributed manner. It is to be noted that in FIG. 1 three data storage nodes (71*a* to 71*c*) are shown as an example, but the number of data storage nodes is not limited to modes shown in the drawings.

The plurality of object data items are respectively characterized by a data coordinate and uniquely identified by a data identifier. The plurality of data storage nodes (71*a* to 71*c*) are respectively assigned a node coordinate in a space identical to that of the data coordinate. After selecting as first data storage nodes from among the plurality of data storage nodes (71*a* to 71*c*) a plurality of data storage nodes (for example, 71*a* and 71*b*) each assigned a node coordinate having a relatively short distances from a data coordinate characterizing each of the plurality of object data items, the object data item is stored in a data storage node (for example, 71*a*) determined based on a data identifier that identifies the object data item from among the plurality of first data storage nodes (71a and 71b).

Here, data coordinates characterizing the plurality of object data items respectively and node coordinates assigned to the plurality of data storage nodes (71a to 71c) respectively may be coordinates in a Euclidean space having as coordinate axes a plurality of evaluation axes with which the plurality of object data items are quantitatively evaluated.

A plurality of data storage nodes each assigned a node coordinate within a prescribed distance from an object data item may be selected as first data storage nodes from among the plurality of data storage nodes (71a to 71c). Furthermore, a prescribed number of data storage nodes, each assigned a node coordinates having a relatively short distance from an object data item, may be selected in order from shortest distance as first data storage nodes from among the plurality of data storage nodes (71a to 71c)

A plurality of pseudo random numbers generated using a data identifier that identifies an object data item as a seed are respectively assigned to the plurality of first data storage nodes (for example, 71a and 71b); and a data storage node having a maximum value that is obtained by multiplying with an assigned pseudo random number a weight calculated according to a distance between a data coordinate of the object data item and a node coordinate assigned to each of the plurality of first data storage nodes (71a and 71b), is extracted from among the plurality of first data storage nodes (71a and 71b), and the extracted data storage node (for example, 71a) is determined as a data storage node to store the object data item. Here, the weight may increase as a distance between a data coordinate characterizing each of the plurality of object data items and a node coordinate assigned to each of the plurality of data storage nodes decreases (71a to 71c).

Each of the plurality of data storage nodes (71a to 71c) may be assigned a node coordinate according to a distribution of data coordinates characterizing the plurality of object data items. For example, for an area where distributed density of data coordinates is high, the node coordinate may be assigned with high probability.

Referring to FIG. 1, the distributed storage system (70) may further comprise a client node (72) that writes an object data item to the plurality of data storage nodes (71a to 71c) and reads an object data item stored in the plurality of data storage nodes (71a to 71c). The client node (72) may select as first data storage nodes from among the plurality of data storage nodes (71a to 71c) a plurality of data storage nodes (71a and 71b) each assigned a node coordinate that has a relatively short distance from a data coordinates characterizing an object data item, and writes the object data item in a data storage node (for example, 71a) determined based on a data identifier of the object data item from among the plurality of first data storage nodes (71a to 71c).

The client node (72) may select as first data storage nodes from among the plurality of data storage nodes (71a to 71c) a plurality of data storage nodes (71a and 71b) each assigned a node coordinate that has a relatively short distance from a data coordinate characterizing an object data item, and send a command to read the object data item to the selected plurality of first data storage nodes (71a and 71b). Alternatively, the client node may selects as first data storage nodes from among the plurality of data storage nodes (71a to 71c) a plurality of data storage nodes (71a and 71b) each assigned a node coordinate that has a relatively short distance from a data coordinate characterizing an object data item, and send a command to read the object data item to a data storage node (for example, 71a) determined based on a data identifier that identifies the object data item from among the plurality of first data storage nodes (71a and 7ab).

According to the distributed storage system according to the present description, in a distributed processing environment that does not use a specific node to centrally manage and control a plurality of storage nodes, it is possible to distribute and store an object data item approximately uniformly to respective nodes with distribution based on respective properties thereof; furthermore it is possible to specify a node storing the object data item from a plurality of numerical indices (data coordinates) representing a data property of the object data item and data identifiers of the object data item; and in addition, it is possible to limit to some of the nodes, nodes that store the object data item from the plurality of the numerical indices (data coordinates) representing the data property of the object data item.

It is to be noted that the following modes are possible for the present description.
<Mode 1>
A distributed storage system may be the distributed storage system according to the first aspect described above.
<Mode 2>
Data coordinates characterizing each of the plurality of object data items and node coordinates assigned to each of the plurality of data storage nodes may be coordinates in a Euclidean space having as coordinate axes a plurality of evaluation axes with which the plurality of object data items are quantitatively evaluated.
<Mode 3>
A plurality of data storage nodes each assigned a node coordinate within a prescribed distance from an object data item may be selected as first data storage nodes from among the plurality of data storage nodes.
<Mode 4>
A prescribed number of data storage nodes, each assigned a node coordinate having a relatively short distance from an object data item, may be selected in order from shortest distance as first data storage nodes from among the plurality of data storage nodes.
<Mode 5>
A plurality of pseudo random numbers generated using a data identifier that identifies an object data item as a seed may be respectively assigned to the plurality of first data storage nodes, and a data storage node having a maximum value that is obtained by multiplying with an assigned pseudo random number a weight calculated according to a distance between a data coordinate of the object data item and a node coordinate assigned to each of the plurality of first data storage nodes, may be extracted from among the plurality of first data storage nodes, and the extracted data storage node may be determined as a data storage node to store the object data item.
<Mode 6>
The weight may increase as a distance between a data coordinate characterizing each of the plurality of object data items and a node coordinate assigned to each of the plurality of data storage nodes decreases.
<Mode 7>
Each of the plurality of data storage nodes may be assigned a node coordinate according to a distribution of the data coordinates characterizing the plurality of object data items.
<Mode 8>
The distributed storage system may further comprise a client node that writes an object data item to the plurality of data storage nodes, and reads an object data item stored in the plurality of data storage nodes.

<Mode 9>

The client node may select as first data storage nodes from among the plurality of data storage nodes a plurality of data storage nodes each assigned a node coordinate that has a relatively short distance from a data coordinate characterizing an object data item, and write the object data item in a data storage node determined based on a data identifier of the object data item from among the plurality of first data storage nodes.

<Mode 10>

The client node may select as first data storage nodes from among the plurality of data storage nodes a plurality of data storage nodes each assigned a node coordinate that has a relatively short distance from a data coordinate characterizing an object data item, and send a command to read the object data item to the selected plurality of first data storage nodes.

<Mode 11>

The client node may select as first data storage nodes from among the plurality of data storage nodes a plurality of data storage nodes each assigned a node coordinate that has a relatively short distance from a data coordinate characterizing an object data item, and send a command to read the object data item to a data storage node determined based on a data identifier that identifies the object data item from among the plurality of first data storage nodes.

<Mode 12>

A distributed storage method may be the distributed storage method according to the second aspect described above.

<Mode 13>

Data coordinates characterizing each of the plurality of object data items and node coordinates assigned to each of the plurality of data storage nodes may be coordinates in a Euclidean space having as coordinate axes a plurality of evaluation axes with which the plurality of object data items are quantitatively evaluated.

<Mode 14>

The distributed storage method may comprise selecting as first data storage nodes from among the plurality of data storage nodes a plurality of data storage nodes each assigned a node coordinate within a prescribed distance from an object data item.

<Mode 15>

The distributed storage method may comprise selecting a prescribed number of data storage nodes, each assigned a node coordinate having a relatively short distance from an object data item, in order from shortest distance as first data storage nodes from among the plurality of data storage nodes.

<Mode 16>

The distributed storage method may comprise: assigning a plurality of pseudo random numbers, generated using a data identifier of an object data item as a seed, respectively to the plurality of first data storage nodes; extracting from among the plurality of first data storage nodes a data storage node having a maximum value that is obtained by multiplying with an assigned pseudo random number a weight calculated according to a distance between a data coordinate of the object data item and a node coordinate assigned to each of the plurality of first data storage nodes; and determining the extracted data storage node as a data storage node to store the object data item.

<Mode 17>

The distributed storage method may comprise assigning node coordinates to each of the plurality of data storage nodes in accordance with a distribution of the data coordinates characterizing the plurality of object data items.

First Exemplary Embodiment

Figure 3:
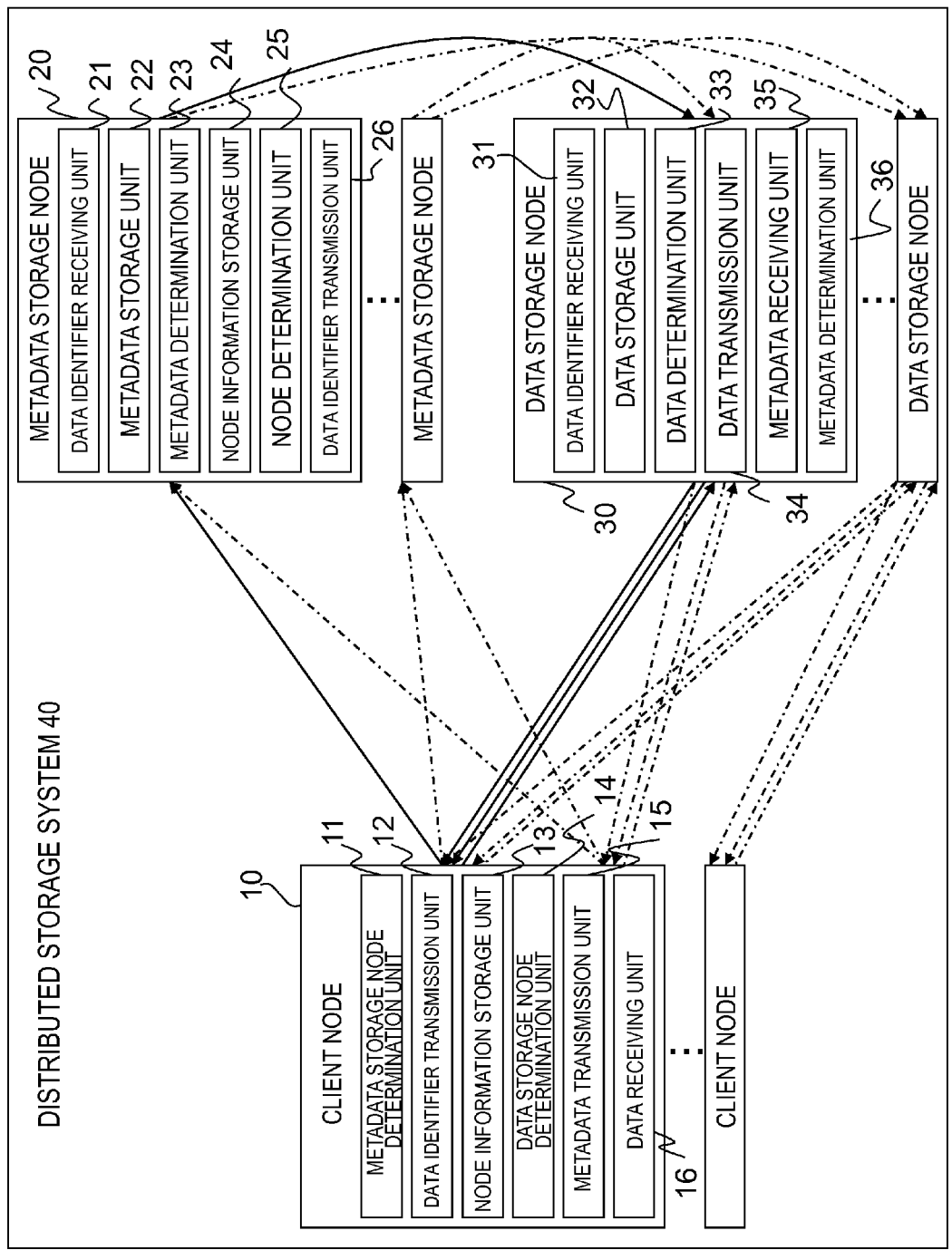
FIG. 3 is a block diagram showing a configuration of the distributed storage system according to the first exemplary embodiment.
Figure 4:
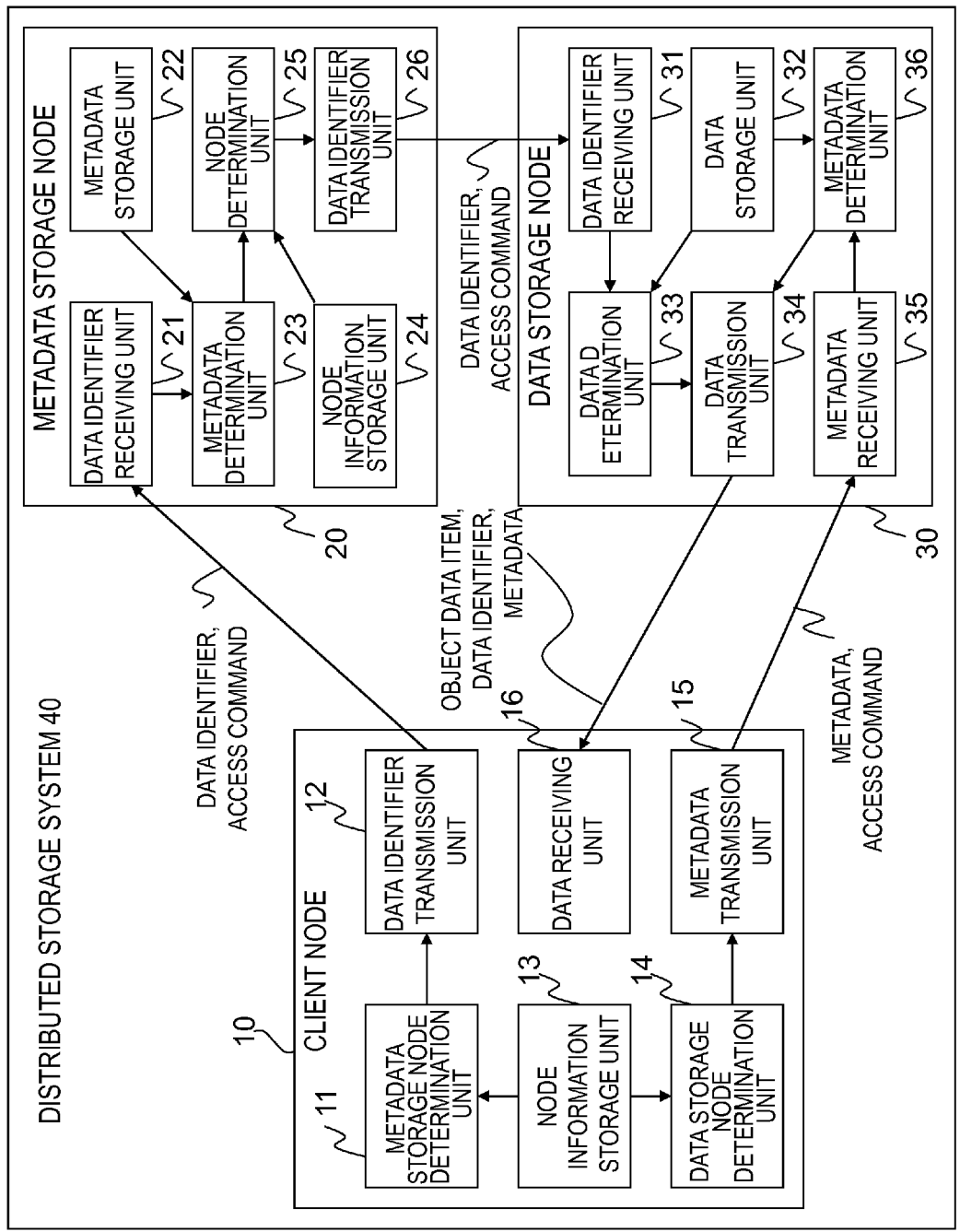
FIG. 4 is a block diagram showing a configuration of the distributed storage system according to the first exemplary embodiment.

A description is given concerning a distributed storage system according to a first exemplary embodiment, making reference to the drawings. FIG. 2 is a block diagram schematically showing a configuration of the distributed storage system 40 according to the present exemplary embodiment. FIG. 2 includes two drawings, 2A and 2B. FIG. 3 is a block diagram schematically showing an internal configuration of each node, in the distributed storage system 40 according to the present exemplary embodiment. FIG. 4 is a block diagram schematically showing details of each node in the distributed storage system 40 according to the present exemplary embodiment.

The distributed storage system 40 shown in FIG. 2A to FIG. 4 is a system for distributed storage of a plurality of data. The distributed storage system 40 stores data approximately uniformly in data storage nodes 30, and in addition stores data in data storage nodes 30 in a biased manner in accordance with a plurality of numerical indices representing a data property.

In the present exemplary embodiment, similar to the background art described above, data to be processed are called "object data item." The object data item, for example, may be numerical data, a software program (computer program) in which prescribed processing (process, function, algorithm) is described, or the like.

Figure 2A:
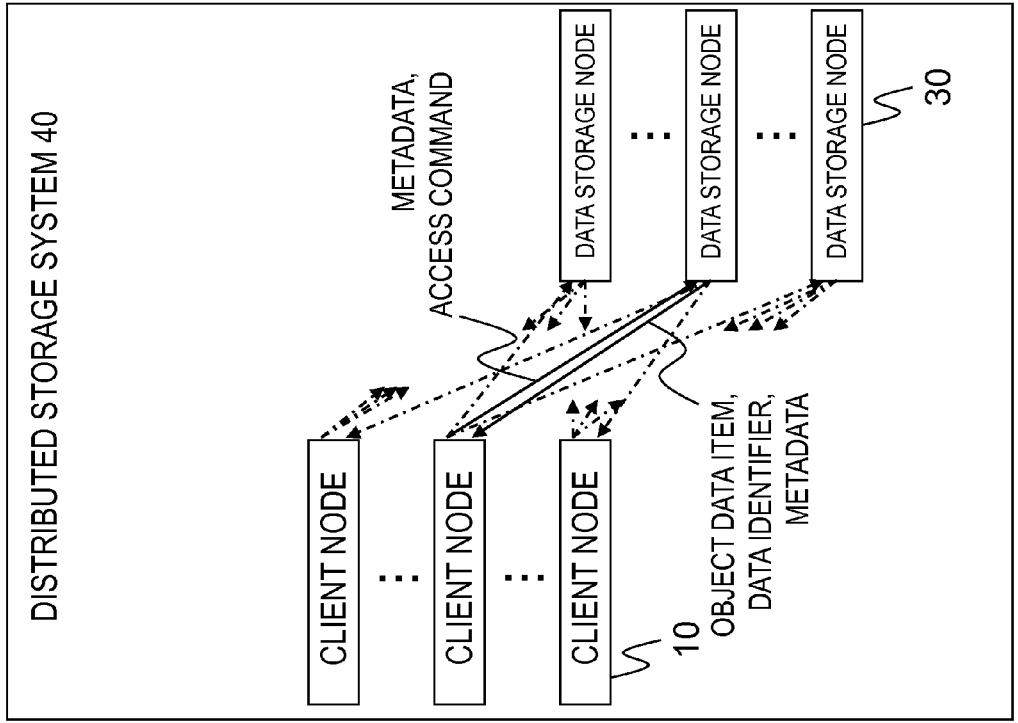
FIGS. 2A and 2B are block diagrams schematically showing a configuration of a distributed storage system according to a first exemplary embodiment.

Referring to FIG. 2A, the distributed storage system 40 is provided with a plurality of client nodes 10, a plurality of metadata storage nodes 20, and a plurality of data storage nodes 30. The client nodes 10, the metadata storage nodes 20, and the data storage nodes 30 according to the present exemplary embodiment are connected such that communication between them is enabled.

Next, a description is given concerning the client nodes 10, the metadata storage nodes 20, and the data storage nodes 30.

Referring to FIG. 2A, a client node 10 determines, from a data identifier of an object data item accessed, a metadata storage node 20 storing metadata corresponding to the relevant data identifier. The data identifier and an access command are sent to the relevant metadata storage node 20.

The metadata storage node 20 receives the data identifier and the access command sent from the client node 10. The metadata storage node 20 then selects a data storage node 30 holding an object data item based on a prescribed rule (to be described later) on the basis of the metadata corresponding to the relevant data identifier and the relevant access command. Next, the metadata storage node 20 sends the data identifier and the access command to the selected data storage node 30. "Metadata" includes numerical data obtained by evaluating characteristics of the object data item by a plurality of indices. That is, in the present exemplary embodiment, data identifiers and metadata do not necessarily match.

The data storage node 30 receives the data identifier and access command sent from the metadata storage node 20. Next, the data storage node 30 returns an object data item corresponding to the data identifier, the data identifier and metadata to the client node 10.

As another access method, the following method may be used.

Figure 2B:
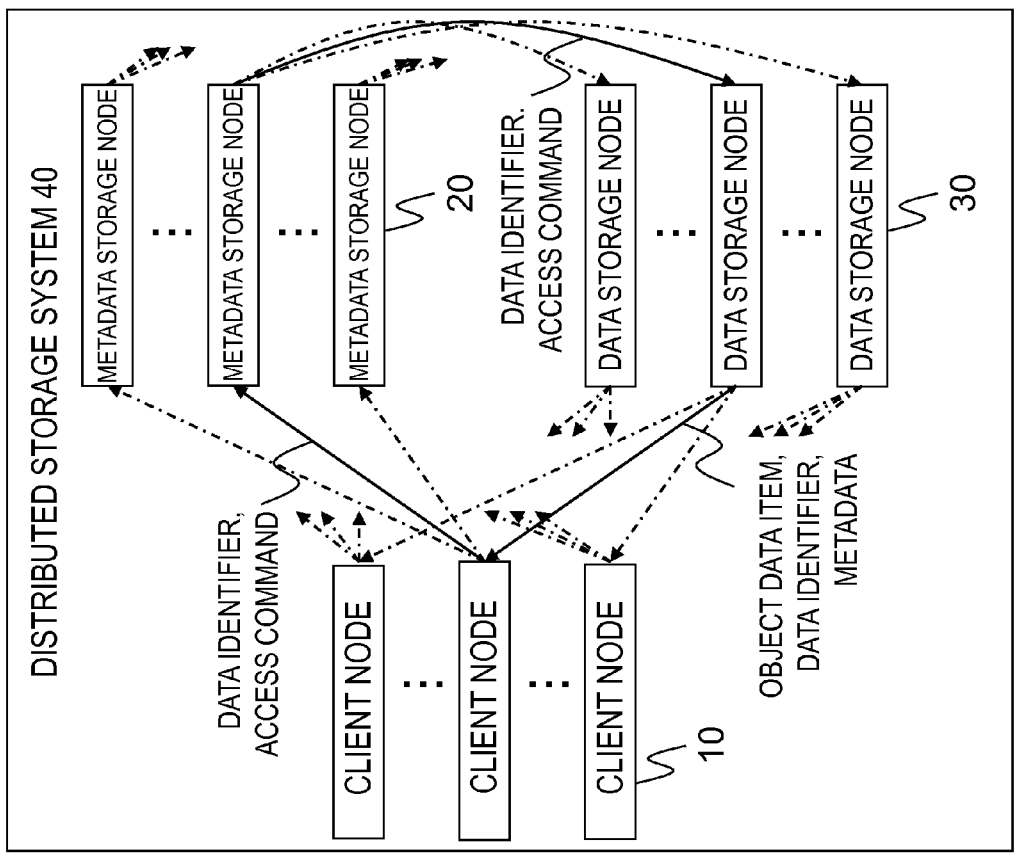

Referring to FIG. 2B, the client node 10 selects a data storage node 30 that possibly holds an object data item corresponding to metadata, based on a rule, and sends the metadata and an access command to the selected data storage node 30. In this case, a plurality of data storage nodes 30 may be selected.

The data storage node 30 receives the metadata and access command sent by the client node 10, and returns an object data item corresponding to the relevant metadata, a data identifier and metadata to the client node 10. In this case, the data storage node 30 may not hold an object data item corresponding to the metadata, or may hold a plurality of object data items corresponding to the metadata.

In the present exemplary embodiment, for convenience a description is given of a case where the distributed storage system 40 is provided with 3 types of node as in FIG. 2A. However, the present description is not limited to configurations shown in FIG. 2 to FIG. 4, and for example, functions of all or some of these nodes may be implemented in a virtual machine environment. It is to be noted that a specific example of a hardware configuration for implementing the distributed storage system 40 will be described later, making reference to FIG. 7.

"I. Case of Reading Data"

With regard to the distributed storage system 40, a description is given concerning details of operation in a case of reading data, making reference to the drawings.

"Client Node 10"

Referring to FIG. 4, the client node 10 is provided with a metadata storage node determination unit 11, a data identifier transmission unit 12, a node information storage unit 13, a data storage node determination unit 14, a metadata transmission unit 15, and a data receiving unit 16.

First, as shown in FIG. 2A, a description is given of a case where the client node 10 obtains an object data item using a data identifier. The metadata storage node determination unit 11 determines a metadata storage node 20 that stores a combination of a data identifier and metadata corresponding to the data identifier, from the data identifier of the object data item and the node number of the metadata storage node 20 stored by the node information storage unit 13. Next, the data identifier transmission unit 12 transmits the data identifier and an access command to the relevant metadata storage node 20. Various methods can be used by which the metadata storage node determination unit 11 determines the metadata storage node 20 storing the combination of a data identifier corresponding to the relevant data identifier and metadata. For example, it is possible to use a method described in Patent Literature 1, Non Patent Literature 1 or Non Patent Literature 2.

Next, a description is given of a case where the client node 10 obtains an object data item from the metadata. The data storage node determination unit 14 determines a data storage node 30 that possibly stores the object data item, using "algorithm B" to be described later, from data coordinates included in the metadata and node coordinates stored by the node information storage unit 13. Next, the metadata transmission unit 15 sends the metadata and an access command to the relevant data storage node 30. Coordinate axes the same as those of the data coordinates are used as the coordinate axes of the node coordinates. A description is given later concerning a method of specifying coordinate data held by the node coordinates.

The data receiving unit 16 receives an object data item, data identifier and metadata sent from the data storage node 30.

"Metadata Storage Node 20"

Referring to FIG. 4, the metadata storage node 20 is provided with a data identifier receiving unit 21, a metadata storage unit 22, a metadata determination unit 23, a node information storage unit 24, a node determination unit 25, and a data identifier transmission unit 26.

The data identifier receiving unit 21 receives a data identifier and access command sent by the client node 10. The metadata storage unit 22 stores metadata corresponding to the relevant data identifier.

The metadata determination unit 23 receives the metadata corresponding to the data identifier from the metadata storage unit 22, and sends the same to the node determination unit 25.

The metadata include numerical data coordinates obtained as a result of evaluating an object data item corresponding to the metadata in accordance with various evaluation axes. Various evaluation axes are used as the evaluation axes with which the object data item are evaluated, according to individual systems. Here, the evaluation axes to be used are not particularly limited.

The node determination unit 25 selects a data storage node 30 that is a destination of a data identifier received, based on "algorithm A" to be described later, from metadata corresponding to the received data identifier and node information stored in the node information storage unit 24. The node information includes node coordinates, node number and node access information of the data storage node 30. The node number is a unique number for each data storage node.

Next, the data identifier transmission unit 26 sends a data identifier and an access command to the selected data storage node 30.

"Metadata Storage Node 30"

Referring to FIG. 4, the data storage node 30 is provided with a data identifier receiving unit 31, a data storage unit 32, a data determination unit 33, a data transmission unit 34, a metadata receiving unit 35, and a metadata determination unit 36.

The data identifier receiving unit 31 receives a data identifier and an access command from the metadata storage node 20. The data storage unit 32 stores an object data item corresponding to the received data identifier, the data identifier, and metadata.

The data determination unit 33 obtains an object data item corresponding to the received data identifier and metadata, from the data storage unit 32.

Next, the data transmission unit 34 sends the object data item, the data identifier and the metadata to the client node 10.

The metadata receiving unit 35 receives the metadata from the client node 10. In this case, the metadata determination unit 36 obtains the data identifier and the object data item corresponding to the received metadata from the data storage unit 32. In this case, the data storage unit 32 may not store the data identifier and an object data item corresponding to the received metadata, or may store a plurality thereof. Next, the data transmission unit 34 sends the object data item, data identifier and metadata to the client node 10. Here, the object data item, data identifier and metadata are sent to the client node 10, but there is no limitation thereto, with regard to information returned to the client node 10.

"Algorithm A"

Figure 5:
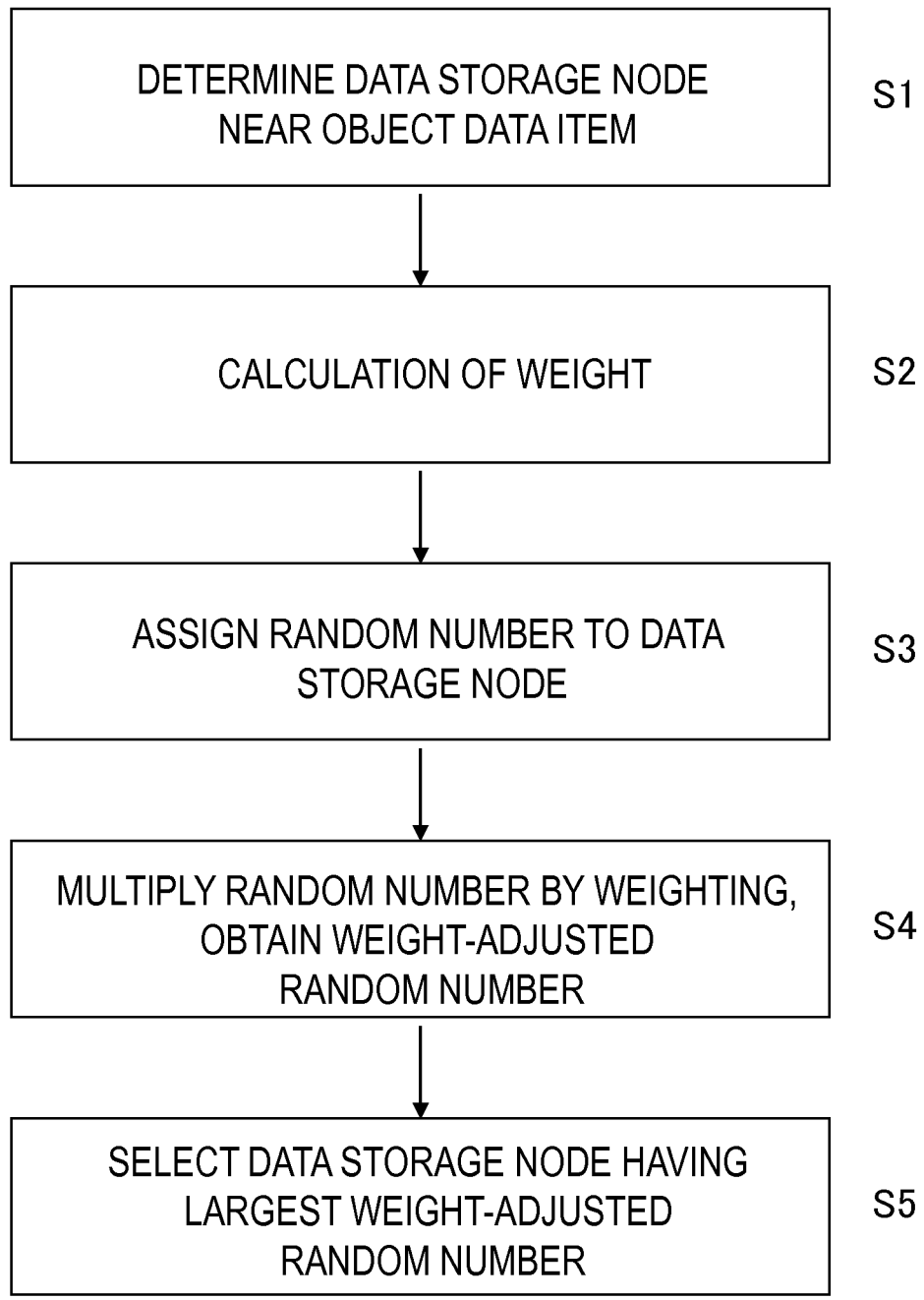
FIG. 5 is a flowchart showing processing in which a metadata storage node determines a data storage node, in the distributed storage system according to the first exemplary embodiment.

FIG. 5 is a flowchart of the "algorithm A."

A distance is calculated between an object data item and data storage nodes 30 in a case where data coordinates of the object data item and node coordinates of the data storage nodes 30 are deployed to a "space," and a data storage node 30 is selected by a "predetermined rule" in order of shortest distance from the object data item (step S1).

As an example of the "space," a multidimensional Euclidean space with orthogonal evaluation axes may be used. As the "predetermined rule" various rules may be used, such as a rule limiting the number of selected data storage nodes 30, a rule limiting the distance, a rule limiting both the number of selected data storage nodes 30 and the distance, or the like. When selecting data storage nodes 30 matching a rule, a method of limiting the data storage nodes 30 for which distance is calculated may be used, instead of calculating the distance between all data storage nodes 30 and an object data item.

Next, a weight is calculated from the distance (step S2). The shorter the distance is, the larger the weight. As an example of a method of calculating the weight from the distance, it is possible to use the reciprocal of the distance as the weight.

Next, random numbers are generated with a data identifier of the object data item as a seed, and are assigned to the data storage nodes 30 selected in step S1 (step S3). As a method of generating the random numbers, a pseudo random number generation method is used, in which the same random number is generated if the seed is the same. Here, an N-th random number generated is assigned to a data storage node 30 having a node number of N.

Next, the random numbers assigned to the data storage nodes 30 are multiplied by the weights of the respective data storage nodes 30, and weight-adjusted random numbers are obtained (step S4).

Next, a search is made for the largest weight-adjusted random number among the weight adjusted random numbers, and the data storage node 30 having the largest weight-adjusted random number is selected (step S5).

According to "algorithm A," biasing is performed in accordance with the weights, and a data storage node 30 storing an object data item can be selected. That is, an object data item with near data coordinates is stored in a limited data storage node 30 with the same or near node coordinates. In a case where a data identifier and data coordinates of the same object data item, and node coordinates and node number of the data storage node 30 are given, the same data storage node 30 is always selected. Moreover, in a case where a data storage node 30 is added or removed, it is possible to curtail to a minimum the number of object data items for which data storage node 30 selection is changed.

"Algorithm B"

"Algorithm B" is similar to step S1 of "algorithm A." Distance is calculated between metadata and data storage nodes 30 when data coordinates included in metadata and node coordinates of the data storage node 30 are deployed to a "space," and a data storage node 30 is selected by a "predetermined rule" in an order of nearness to the metadata.

As an example of the "space," a multidimensional Euclidean space with orthogonal evaluation axes may be used. As the "predetermined rule," various rules may be used, such as a rule limiting the number of selected data storage nodes 30, a rule limiting the distance, a rule limiting both the number of selected data storage nodes 30 and the distance, or the like. When selecting data storage nodes 30 matching a rule, a method may be used of limiting the data storage nodes 30 for which calculation is necessary, instead of calculating the distance between all data storage nodes 30 and the metadata.

"Method of Determining Node Coordinates of Data Storage Nodes 30"

The node coordinates of a data storage node 30 may be arbitrarily set. However, in a case where the data coordinates of the object data item and the node coordinates of the data storage node 30 are deployed to a space, when more data storage nodes 30 are present near a space where more object data items are present, the number of object data items stored by the respective data storage nodes 30 becomes more uniform.

Various methods can be used to arrange more data storage nodes 30 near a space where more object data items are present. For example, node coordinates may be adjusted so as to pre-arrange more data storage nodes 30 near a space with a high probability of object data items being present. In order to move a spatial position of a data storage node 30 where there are few stored object data items, to near a spatial position where more object data items are present, the node coordinates of the data storage node 30 may be changed. In addition, when a data storage node 30 is added, the data storage node 30 may be added near a spatial position where many object data items are present.

"II. Case of Writing Data"

With regard to the distributed storage system 40, a description is given concerning details of operation in a case of writing data, making reference to the drawings.

"Client Node 10"

In a case where the client node 10 writes an object data item using a data identifier and metadata, the metadata storage node determination unit 11 determines a metadata storage node 20 in which metadata corresponding to the relevant data identifier is to be stored, from the data identifier and the node number of the metadata storage node 20 stored by the node information storage unit 13. Next, the data identifier transmission unit 12 transmits the object data item, the data identifier, the metadata and an access command to the relevant metadata storage node 20.

"Metadata Storage Node 20"

The data identifier receiving unit 21 receives the object data item, the data identifier, the metadata and the access command sent from the client node 10. Next, the data identifier and the metadata are stored in the metadata storage unit 22. The data identifier and the metadata are sent to the node determination unit 25. The node determination unit 25 selects the data storage node 30 that is a transmission destination of the data identifier, the metadata and the access command, based on "algorithm A," from the data identifier, metadata and node information stored by the node information storage unit 24. Next, the data identifier transmission unit 26 transmits the object data item, the data identifier, the metadata and the access command to the selected metadata storage node 30.

"Metadata Storage Node 30"

The data identifier receiving unit 21 receives the object data item, the data identifier, the metadata and the access command. Next, the data storage unit 32 stores the object data item, the data identifier and the metadata.

According to the distributed storage system 40 according to the present exemplary embodiment, an object data item having a near evaluation according to an arbitrarily set evaluation axis can be stored in the same or limited data storage nodes 30. That is, it is possible to limit the data storage nodes 30 storing the object data item, from data coordinates of the object data item and node coordinates of the data storage nodes 30. It is possible to identify the metadata storage node 20 storing the metadata of the object data item, from the data identifier and the node number of the data storage node 30. In addition it is possible to identify the data storage node 30 storing the object data item, from the data identifier, the data coordinates of the object data item, and the node coordinates and node number of the data storage node 30. That is, it is possible to efficiently identify the data storage node 30 storing the object data item, from the data identifier of the object data item.

By adjusting the node coordinates, it is possible to approximately uniformly distribute the object data item to the data storage nodes 30. Therefore, according to the present exemplary embodiment, in a distributed processing environment that does not use a specific node to centrally manage and control a plurality of nodes, it is possible to have an efficient implementation of both direct access to data based on identifier and range-access in accordance with a range specified according to evaluation of data, and it is possible to approximately uniformly distribute data to all nodes, while biasing data to some nodes in accordance with a property of the data.

It is to be noted that in the present exemplary embodiment, for convenience in the description, 1 node is selected in both a case of selecting a metadata storage node 20 by the client node 10, and selecting a data storage node 30 by the selected metadata storage node 20. However, the number of nodes selected is not limited to 1. For example, in a case where the metadata storage node 20 or the data storage node 30 uses a mirror configuration, a plurality of nodes using the mirror configuration may be selected in the distributed storage system 40 described above. In this case, it is possible for nodes to share information for determining which node among the plurality of selected nodes that use the mirror configuration is a primary node at the point in time of the present operation.

Second Exemplary Embodiment

A description is given concerning a distributed storage system according to a second exemplary embodiment, as a modified example of the first exemplary embodiment, making reference to the drawings.

Figure 6:
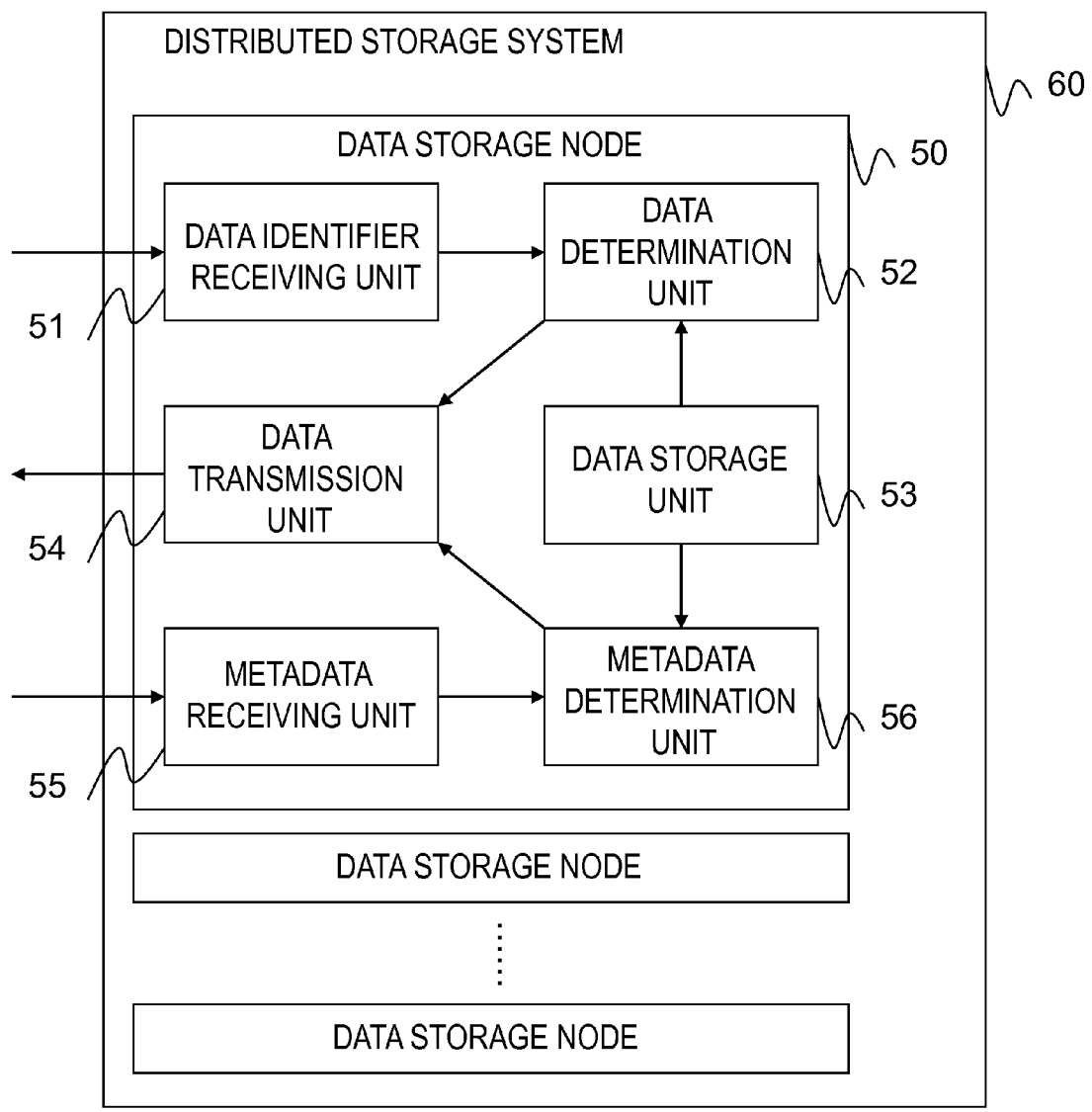
FIG. 6 is a diagram schematically describing an overall configuration of a distributed storage system according to a second exemplary embodiment.

FIG. 6 is a block diagram schematically showing a configuration of a distributed storage system 60 according to the present exemplary embodiment. Referring to FIG. 6, the distributed storage system 60 is provided with a plurality of data storage nodes 50. A data storage node is provided with a data identifier receiving unit 51, a data determination unit 52, a data storage unit 53, a data transmission unit 54, a metadata receiving unit 55, and a metadata determination unit 56.

On receiving an access command having a data identifier from a client node (not shown in the drawings) or the data storage node 50, via the data identifier receiving unit 51, the data storage node 50 performs the following operation.

In a case of having an object data item and metadata corresponding to the data identifier, the data determination unit 52 reads an object data item and metadata corresponding to the data identifier from the data storage unit 53, and returns the object data item, the data identifier and the metadata, via the data transmission unit 54, to the client node (not shown in the drawings) that issued the access command.

In a case of having metadata corresponding to the data identifier, the data determination unit 52 reads the metadata corresponding to the data identifier from the data storage unit 53, determines a data storage node 50 having an object data item corresponding to the relevant data identifier and the relevant metadata, and forwards the data identifier and the access command to the relevant data storage node 50, via the data transmission unit 54. When determining a data storage node 50 that has an object data item corresponding to the relevant data identifier and the relevant metadata, the data determination unit 52 uses "algorithm A," which is used by the node determination unit 25 in the first exemplary embodiment.

On the other hand, in a case of not having metadata corresponding to the data identifier, the data determination unit 52 determines a data storage node 50 having metadata corresponding to the data identifier, and forwards the data identifier and the access command to the relevant data storage node 50, via the data transmission unit 54. When determining the data storage node 50 that has metadata corresponding to the relevant data identifier, the data determination unit 52 can use various processes, similar to processing used by the metadata storage node determination unit 11 in the first exemplary embodiment.

On receiving an access command having only metadata from a client node (not shown in the drawings), via the metadata receiving unit 55, the data storage node 50 performs the following operation.

The metadata determination unit 56 selects the data storage node 50 that possibly holds an object data item corresponding to the metadata received from the client node (not shown in the drawings), and sends the metadata and an access command to the selected data storage node 50. The metadata determination unit 56 uses "algorithm B" when selecting the data storage node 50 that possibly holds the object data item. In this case, a plurality of data storage nodes 50 may be selected.

On receiving an access command having only metadata from another data storage node 50, via the metadata receiving unit 55, the data storage node 50 performs the following operation.

The metadata determination unit 56 reads an object data item and a data identifier corresponding to metadata received from the data storage unit 53, and returns to the client node (not shown in the drawings) that sent the access command, the object data item, the data identifier and the metadata, via the data transmission unit 54. In a case where an object data item corresponding to the metadata is not stored, the data storage node 50 may report that the object data item is not held to the client node (not shown in the drawings), or may not return any information. Furthermore, in a case where the data storage node 50 stores a plurality of object data items corresponding to the metadata, it returns the plurality of object data items to the client node (not shown in the drawings).

According to the distributed storage system 60 according to the present exemplary embodiment, the object data item having a near evaluation according to an arbitrarily set evaluation axis can be stored in the same or limited data storage nodes 50. That is, it is possible to limit the data storage nodes 50 storing the object data item, from data coordinates of the object data item and node coordinates of the data storage nodes 50. It is possible to identify a data storage node 50 storing the metadata of the object data item, from the data identifier. In addition it is possible to identify the data storage node 50 storing the object data item, from the data identifier and data coordinates of the object data item, and also the node coordinates and node number of the data storage node 50. That is, it is possible to efficiently identify the data storage node 50 storing the object data item, from the data identifier of the object data item.

By adjusting the node coordinates, it is possible to approach a uniform distribution of the object data item to the data storage nodes 50. Therefore, according to the present exemplary embodiment, in a distributed processing environment that does not use a specific node to centrally manage and control a plurality of nodes, it is possible to have an efficient implementation of both direct access to data based on an identifier of the data and range-access in accordance with a range specified according to evaluation of the data, and it is possible to approximately uniformly distribute data to all nodes, while biasing data to some nodes in accordance with a property of the data.

EXAMPLES

A description is given based on a specific example concerning the distributed storage system 40 according to the first exemplary embodiment. In the present example, the distributed storage system 40 is applied to a case where people's names are distributed according to height and weight information.

The distributed storage system 40 according to the present example is a distributed storage system that is accessed by a client node 10. With people as a target, their names are stored as object data items. Management numbers of the people are used as data identifiers, and numerical values by which height and weight are respectively evaluated are used as data coordinates of metadata. The metadata storage unit 20 stores the data identifiers and the metadata, which are distributed based on the data identifiers. The data storage node 30 distributes and stores the object data item, the data identifiers and the metadata, in a biased fashion based on the metadata.

First, a description it given concerning a method of obtaining a person's name based on the person's management number.

The metadata storage node determination unit 11 of the client node 10 determines a metadata storage node 20 storing a combination of numerical values that respectively evaluate height and weight corresponding to the management number of a person accessed. Next, the data identifier transmission unit 12 sends the person's management number and an access command to the relevant data storage node 20.

The data identifier receiving unit 21 of the metadata storage node 20 receives the person's management number and the access command. Next, the metadata determination unit 23 obtains the combination of numerical values that respectively evaluate height and weight, corresponding to the received person's management number, from the combination of numerical values that respectively evaluate height and weight and a person's management number recorded in the metadata storage unit 22. Next, the node determination unit 25 determines a data storage node 30 that stores the person's name, from a combination of numerical values that respectively evaluate height and weight, and a person's management number, and node coordinates and node number recorded in the node information storage unit 24. Next, the data identifier transmission unit 26 sends the management number and access command to the data storage node 30 determined as storing the person's name.

The data identifier receiving unit 31 of the data storage node 30 receives the management number. Next, the data determination unit 33 obtains the person's name and a combination of management number stored in the data storage unit 32 and numerical values that respectively evaluate height and weight, corresponding to the received management number. Next, the data transmission unit 34 sends the combination of the management number and numerical values that respectively evaluate height and weight, together with the person's name, to the client.

Next, a description is given of a method of obtaining a person's name, based on a combination of the numerical values respectively evaluating height and weight.

The data storage node determination unit 14 of the client node 10 obtains candidates for the data storage node 30 in which is stored a person's name corresponding to a combination of numerical values respectively evaluating the relevant height and weight, from a combination of numerical values respectively evaluating the height and weight, together with node coordinates stored by the node information storage unit 13. Next, the metadata transmission unit 15 sends a combination of numerical values that respectively evaluate height and weight together with an access command to the relevant data storage node 30.

The metadata receiving unit 35 of the data storage node 30 receives a combination of numerical values that respectively evaluate height and weight, and an access command. Next, the data determination unit 36 obtains the person's name together with a combination of the management number recorded in the data storage unit 32 and numerical values that respectively evaluate height and weight, corresponding to a combination of numerical values that respectively evaluate height and weight, as received. Next, the data transmission unit 34 sends the combination of management number and numerical values that respectively evaluate height and weight, together with the person's name to the client.

In the present example, by using the management number of a person to be accessed, the client node 10 can directly access the metadata storage node 20 storing the combination of numerical values respectively evaluating height and weight corresponding to the relevant management number. By using the management number of the person to be accessed, together with a combination of numerical values respectively evaluating height and weight corresponding to the relevant management number, the client node 20 can directly access the data storage node 30 storing the person's name corresponding to the relevant management number. Furthermore, by using a combination of numerical values that respectively evaluate height and weight, to which access is desired, the client node 10 can limit the data storage nodes 30 that possibly store the person's name and the management number corresponding to the combination of numerical values that respectively evaluate the relevant height and weight, and it is possible to directly access the relevant data storage node 30.

By appropriately adjusting the node coordinates, it is possible to approach a uniform distribution with regard to the number of people's names and a combination of the management number, and the numerical values respectively evaluating height and weight, as stored by the respective data storage nodes 30.

"Hardware Configuration Example"

Figure 7:
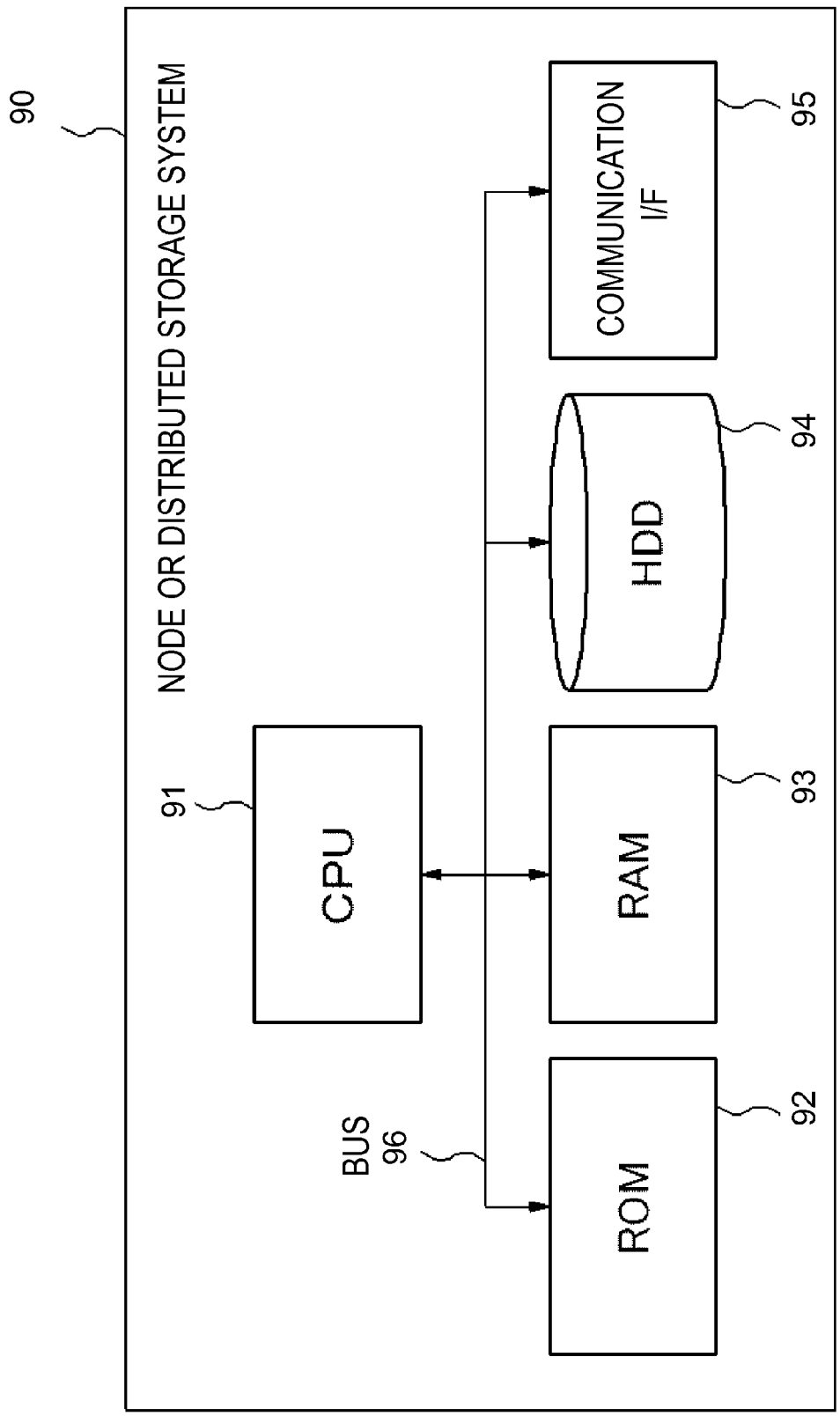
FIG. 7 is a diagram describing an example of a hardware configuration that can execute a distributed storage system according to an exemplary embodiment and an example thereof, or a node configuring the distributed storage system.
Figure 8:
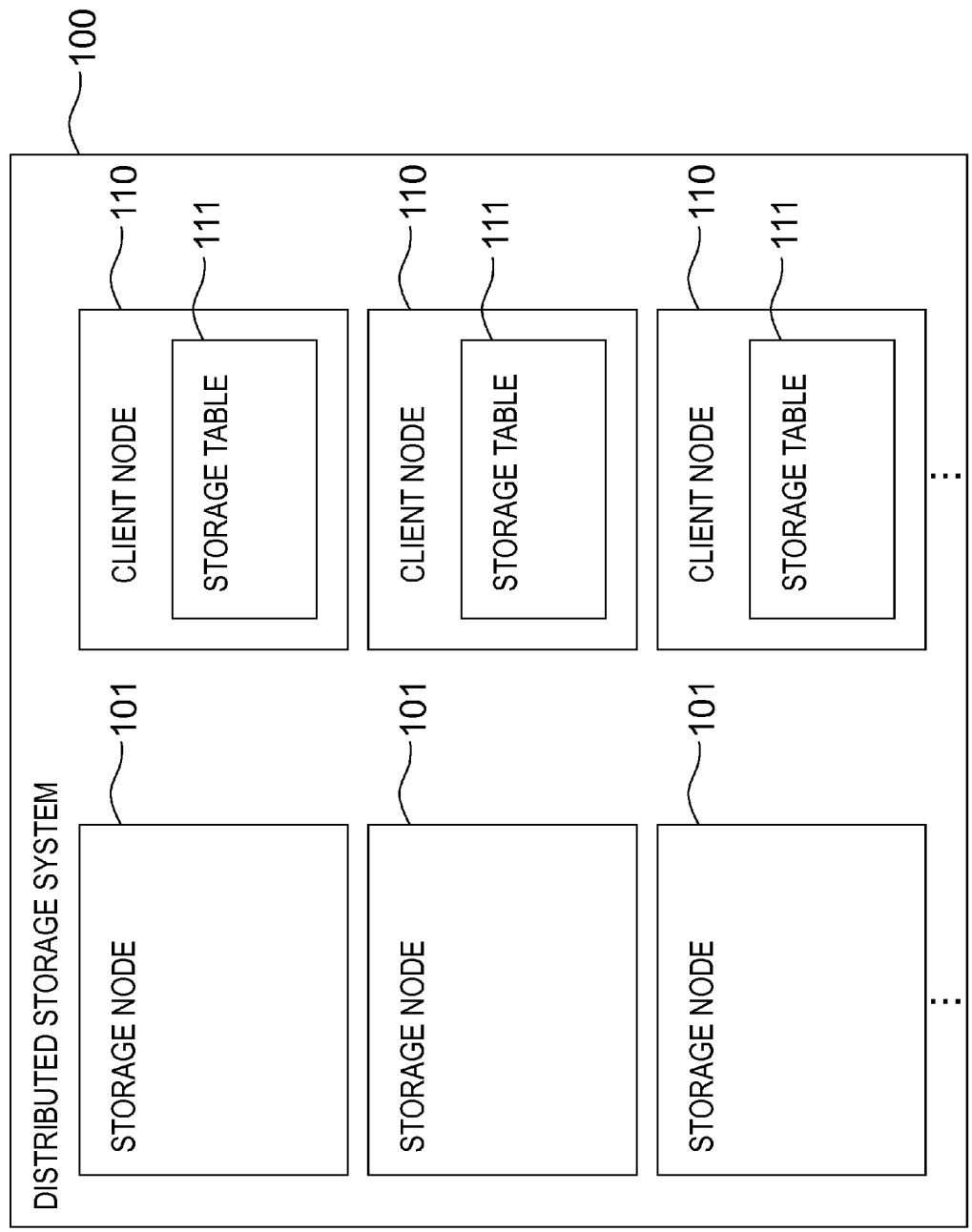
FIG. 8 is a diagram showing an example of a system configuration of a distributed storage system related to the present description.

The respective parts of the distributed storage system 40 according to the first exemplary embodiment and the distributed storage system 60 according to the second exemplary embodiment may be implemented as modules in a software program. Referring to FIG. 7, a description is given of a hardware configuration in this case.

FIG. 7 is a block diagram showing an example of a hardware configuration implementing the distributed storage system 40 or 60, or the nodes forming the distributed storage system. That is, FIG. 7 shows a configuration of a computer implementing the distributed storage system 40 shown in FIG. 2, FIG. 3 or FIG. 4, or all or some nodes of the distributed storage system 60 shown in FIG. 6. Functions of each part of the distributed storage system 40 and the distributed storage system 60 may be implemented by the hardware configuration shown in FIG. 7.

Referring to FIG. 7, the hardware is provided with a CPU (Central Processing Unit) 91, ROM (Read Only Memory) 92, RAM (Random Access Memory) 93, a hard disk drive (HDD: Hard Disk Drive) 94, and an interface (I/F: Interface) 95 for communication with an external apparatus. Here, in a case where the hardware shown in FIG. 7 is a data storage node (storage apparatus) 30, the HDD 94 itself may function as the data storage node 30 in the abovementioned exemplary embodiments and examples.

The abovementioned exemplary embodiments and examples may be accomplished by supplying a computer program that can implement functions of the block diagrams (FIG. 2 to FIG. 4) or the flowchart (FIG. 5) in the hardware of FIG. 7, and then executing reading of the computer program by the CPU 91 of the hardware in question. In this case, the supplied computer program may be stored in a storage apparatus such as the readable RAM 93 or the HDD 94.

In the case described above, as a method of supplying the computer program to the hardware in question, the method used to install the program within the apparatus in question may be through various types of recording media such as a CD-ROM or the like. A method of downloading from outside via a communication line such as the Internet may be used. Furthermore, in such cases, in the present description the computer program code itself, or a recording medium in which the program in recorded, may be provided.

In the exemplary embodiments and examples described above, a description has been given where the present description is applied with respect to a distribution arrangement of object data items. However, the present description can be applied not only to an object data item but also to distributed execution of an algorithm such as a program, or to a distributed arrangement of objects holding a physical entity.

According to the present description, it is possible to efficiently implement distributed storage in a distributed storage environment that does not use a specific node to centrally manage and control a plurality of nodes. The distributed storage system according to the present description is provided with a plurality of data storage nodes. In the system, with regard to the data storage nodes, a specific data storage node is selected from among the plurality of data storage nodes, based on connection information of the plurality of data storage nodes that are connected, and metadata and identifiers of object data items, and the relevant object data item is stored in the selected specific data storage node. In this case, it is possible to limit the data storage nodes that possibly store the relevant object data item from among the plurality of data storage nodes, based on the metadata of the relevant object data item.

The distributed storage system according to the present description is a distributed storage system provided with a client node, and a plurality of data storage nodes connected to the client node.

Here, the client node may have means for transmitting an access command holding an identifier of an object data item or a plurality of numerical indices (metadata) representing a data property of the object data item, to a data storage node; the data storage node may have means for selecting a specific data storage node from among the plurality of data storage nodes, based on an identifier of the object data item, held by the access command, a plurality of numerical indices representing a data property of the object data item, connection information of the plurality of data storage nodes that are connected, and the plurality of numerical indices set in the relevant data storage node, and for forwarding the access command to the relevant data storage node;

means for selecting a specific data storage node from among the plurality of data storage nodes, based on an identifier of the object data item, held by the access command, and connection information of the plurality of data storage nodes that are connected, and for forwarding the access command to the relevant data storage node;

means for selecting limited data storage nodes from among the plurality of data storage nodes, based on a plurality of numerical indices representing a data property of the object data item, held by the access command, connection information of the plurality of data storage nodes that are connected, and the plurality of numerical indices set in the relevant data storage node, and for forwarding the access command to the relevant data storage node; and means for reading the object data item stored by the data storage node and transmitting to the client node; and the object data item stored by the data storage node may be changed; and by changing or adjusting in advance the plurality of numerical indices set in the data storage node, the object data item stored by the data storage node may be changed.

The client node may have means for selecting a specific data storage node from among the plurality of data storage nodes, based on an identifier of the object data item, connection information of the plurality of data storage nodes that are connected, and the plurality of numerical indices set in the relevant data storage node;

means for transmitting an access command having an identifier of the object data item to the relevant data storage node;

means for selecting limited data storage nodes from among the plurality of data storage nodes, based on a plurality of numerical indices representing a data property of the object data item, connection information of the plurality of data storage nodes that are connected, and the plurality of numerical indices set in the relevant data storage node; and means for transmitting an access command having an identifier of the object data item to the relevant data storage node; and the data storage node may have means for selecting a specific data storage node from among the plurality of data storage nodes, based on an identifier of the object data item, held by the access command, a plurality of numerical indices representing a property of data corresponding thereto, connection information of the plurality of data storage nodes that are connected, and the plurality of numerical indices set in the relevant data storage node, and for forwarding the access command to the relevant data storage node; and means for reading the object data item stored by the data storage node and transmitting to the client node; and an object data item stored by a data storage node may be changed; and by changing or adjusting in advance the plurality of numerical indices set in the data storage node, the object data item stored by the data storage node may be changed.

An effect of the present description may be realized also by a distributed processing method corresponding to the distributed storage system with the respective configurations described above. In addition, an effect of the present description may be realized also by a computer program implemented by a computer, and a computer readable storage medium that stores the computer program, with regard to the distributed storage system having the respective configurations described above and to corresponding apparatuses.

The entire disclosures of the above Patent Literature and Non-Patent Literatures are incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

It is to be noted that some or all of the exemplary embodiments described above can be described in the following appendices, but there is no limitation thereto.

(Appendix 1)

A distributed storage system, comprising:
a plurality of data storage nodes, wherein
when there is an object data item characterized by a plurality of indices, and
there is an algorithm that determines the data storage node storing the object data item uniquely from weighted information and an identifier such as an identifier of the object data item, unique numbers of the plurality of data storage nodes, and the like, weights of the data storage nodes are calculated from the respective index values of the object data item and information of the data storage nodes, and the data storage node of the object data item is determined uniquely using the algorithm, from the identifier of the object data item, the identifiers of the data storage nodes and weights of the data storage nodes.

(Appendix 2)
The distributed storage system according to appendix 1, wherein
the algorithm limits the data storage nodes that may possibly be selected, from the respective index values of the object data item and information of the data storage nodes.

(Appendix 3)
The distributed storage system according to appendix 1 or 2, wherein
the information of the data storage nodes comprises numerical values corresponding 1 to 1 with respective indices of the object data item.

(Appendix 4)
The distributed storage system according to appendix 3, wherein
the information of the data storage nodes changes in accordance with distribution of numerical values of the respective indices of the object data item.

(Appendix 5)
The distributed storage system according to appendix 3 or 4, wherein
the weights of the data storage nodes are spatial distances between the object data item and the data storage nodes, when the object data item and the data storage nodes are arranged with values of respective indices of the object data item and values corresponding 1 to 1 with the respective indices of the object data item of the data storage nodes as spatial positions, in a space that has information of respective indices of the object data item and of the data storage nodes corresponding 1 to 1 with the respective indices of the object data item, as coordinate axes.

(Appendix 6)
The distributed storage system according to appendix 5, wherein
the space with information of respective indices of the object data item and of data storage nodes corresponding 1 to 1 with the respective indices of the object data item, as coordinate axes, is a Euclidean space in which coordinate axes are orthogonal.

(Appendix 7)
The distributed storage system according to any of appendices 1 to 6, wherein
the algorithm, in a case of there being data storage nodes having weights and unique numbers, and an object data item having an identifier, generates pseudo random numbers according to a pseudo random number generation function having an identifier of the object data item as a seed, and with the random numbers generated in the same order as the unique numbers of the data storage nodes, as random numbers of the data storage nodes, and with values of the random numbers of the data storage nodes multiplied by the weights as weighted random numbers of the data storage nodes, the data storage node with the largest weighted random number of the data storage nodes is a node that stores the object data item.

(Appendix 8)
An algorithm execution means determination method, wherein
in a distributed execution system provided with a plurality of algorithm execution means, there is an algorithm characterized by a plurality of indices, and
when there is an execution means determination algorithm that uniquely determines the algorithm execution means that executes the algorithm, from an identifier of the algorithm, an identifier such as a unique number of the plurality of algorithm execution means, and weight information, weights of the algorithm execution means are calculated from respective index values of the algorithms and information of the algorithm execution means, and
an algorithm execution means that executes the algorithm is uniquely determined using the execution means determination algorithm, from the identifier of the algorithm, the identifier of the algorithm execution means, and the weight of the algorithm execution means.

(Appendix 9)
A method of determining a data storage node having a physical entity, wherein
in a distributed storage system provided with a plurality of data storage nodes having a physical entity,
where there is an object having a physical entity characterized by a plurality of indices, and there is an algorithm that uniquely determines a data storage node having the physical entity storing an object having the physical entity, from an identifier of the object having the physical entity, an identifier such as a unique number of the plurality of data storage nodes having a physical entity, and weight information,
weights of the data storage nodes having the physical entity are calculated from the values of respective indices of the objects having the physical entity and information of the data storage nodes having a physical entity, and
a unique determination is made of a data storage node having the physical entity of an object having the physical entity using the algorithm, from an identifier of the object having the physical entity, an identifier of a data storage node having the physical entity, and a weight of the data storage node having the physical entity.

10 client node
11 metadata storage node determination unit
12 data identifier transmission unit
13 node information storage unit
14 data storage node determination unit
15 metadata transmission unit
16 data receiving unit
20 metadata storage node
21 data identifier receiving unit
22 metadata storage unit
23 metadata determination unit
24 node information storage unit
25 node determination unit
26 data identifier transmission unit
30 data storage node
31 data identifier receiving unit
32 data storage unit
33 data determination unit
34 data transmission unit
35 metadata receiving unit
36 metadata determination unit
40 distributed storage system
50 data storage node
51 data identifier receiving unit
52 data determination unit
53 data storage unit 54 data transmission unit
55 metadata receiving unit
56 metadata determination unit
60 distributed storage system
70 distributed storage system
71a to 71c data storage node
72 client node
90 node or distributed storage system
91 CPU (Central Processing Unit)
92 ROM (Read Only Memory)
93 RAM (Random Access Memory)
94 HDD (Hard Disk Drive)
95 communication interface (communication I/F)
96 bus
100 distributed storage system
101 storage node
110 client node
111 storage table

What is claimed is:

1. A distributed storage system, comprising:
a plurality of data storage nodes that store a plurality of object data items in a distributed manner, wherein
each of the plurality of object data items is characterized by a data coordinate defined in a space and uniquely identified by a data identifier,
each of the plurality of data storage nodes is assigned a node coordinate defined in the space,
the distributed storage system is configured to select, for one of the plurality object data items, a plurality of data storage nodes as first data storage nodes from among the plurality of data storage nodes, distances between the node coordinates assigned to the plurality of first data storage nodes and the data coordinate characterizing the one object data item being shorter than distances between the node coordinates assigned to other storage nodes and the data coordinate characterizing the one object data item, and
the distributed storage system is further configured to:
assign a plurality of pseudo random numbers, generated using a data identifier of the one object data item as a seed, respectively, to the plurality of first data storage nodes;
extract, from among the plurality of first data storage nodes, a data storage node, for which a value obtained by multiplying an assigned pseudo random number with a weight calculated according to a distance between a data coordinate of the one object data item and a node coordinate assigned to the data storage node is maximum among the plurality of first data storage nodes; and
determine the extracted data storage node as a data storage node to store the one object data item.

2. The distributed storage system according to claim 1, wherein
data coordinates characterizing each of the plurality of object data items and node coordinates assigned to each of the plurality of data storage nodes are coordinates in a Euclidean space having as coordinate axes a plurality of evaluation axes with which the plurality of object data items are quantitatively evaluated.

3. The distributed storage system according to claim 1, wherein
a plurality of data storage nodes each assigned a node coordinate within a prescribed distance from an object data item are selected as first data storage nodes from among the plurality of data storage nodes.

4. The distributed storage system according to claim 1, wherein
a prescribed number of data storage nodes, each assigned a node coordinate having a short distance from an object data item, are selected in order from shortest distance as first data storage nodes from among the plurality of data storage nodes.

5. The distributed storage system according to claim 1, wherein
the weight increases as a distance between a data coordinate characterizing each of the plurality of object data items and a node coordinate assigned to each of the plurality of data storage nodes decreases.

6. The distributed storage system according to claim 1, wherein
each of the plurality of data storage nodes is assigned a node coordinate according to a distribution of the data coordinates characterizing the plurality of object data items.

7. The distributed storage system according to claim 1, further comprising:
a client node that writes an object data item to the plurality of data storage nodes, and reads an object data item stored in the plurality of data storage nodes.

8. The distributed storage system according to claim 7, wherein
the client node selects as first data storage nodes from among the plurality of data storage nodes a plurality of data storage nodes each assigned a node coordinate that has a short distance from a data coordinate characterizing an object data item, and writes the object data item in a data storage node determined based on a data identifier of the object data item from among the plurality of first data storage nodes.

9. The distributed storage system according to claim 7, wherein
the client node selects as first data storage nodes from among the plurality of data storage nodes a plurality of data storage nodes each assigned a node coordinate that has a short distance from a data coordinate characterizing an object data item, and sends a command to read the object data item to the selected plurality of first data storage nodes.

10. The distributed storage system according to claim 7, wherein
the client node selects as first data storage nodes from among the plurality of data storage nodes a plurality of data storage nodes each assigned a node coordinate that has a short distance from a data coordinate characterizing an object data item, and sends a command to read the object data item to a data storage node determined based on a data identifier that identifies the object data item from among the plurality of first data storage nodes.

11. A distributed storage method, comprising:
storing in a distributed manner a plurality of object data items, each characterized by a data coordinate defined in a space and uniquely identified by a data identifier;
assigning a node coordinate defined in the space to each of the plurality of data storage nodes;
selecting for one of the plurality of data items a plurality of data storage nodes as first data storage nodes from among the plurality of data storage nodes, distances between the node coordinates assigned to the plurality of first data storage nodes and the data coordinate characterizing the one object data item being shorter than distances between the nodes coordinates assigned to other data storage nodes and the data coordinate characterizing the one object data item;

assigning a plurality of pseudo random numbers, generated using a data identifier of the one object data item as a seed, respectively, to the plurality of first data storage nodes;

extracting from among the plurality of first data storage nodes a data storage node, for which a value obtained by multiplying an assigned pseudo random number with a weight calculated according to a distance between a data coordinate of the one object data item and a node coordinate assigned to the data storage node is maximum among the plurality of first data storage nodes; and determining the extracted data storage node as a data storage node to store the object data item.

12. The distributed storage method according to claim 11, wherein
the data coordinates characterizing each of the plurality of object data items and node coordinates assigned to each of the plurality of data storage nodes are coordinates in a Euclidean space having as coordinate axes a plurality of evaluation axes with which the plurality of object data items are quantitatively evaluated.

13. The distributed storage method according to claim 11, comprising:
selecting as first data storage nodes from among the plurality of data storage nodes a plurality of data storage nodes each assigned a node coordinate within a prescribed distance from an object data item.

14. The distributed storage method according to claim 11, comprising:
selecting a prescribed number of data storage nodes, each assigned a node coordinate having a short distance from an object data item, in order from shortest distance as first data storage nodes from among the plurality of data storage nodes.

15. The distributed storage method according to claim 11, comprising:
assigning node coordinates to each of the plurality of data storage nodes in accordance with a distribution of the data coordinates characterizing the plurality of object data items.

16. The distributed storage method according to claim 11, wherein
the weight increases as a distance between a data coordinate characterizing each of the plurality of object data items and a node coordinate assigned to each of the plurality of data storage nodes decreases.

* * * * *